No. 737,399. PATENTED AUG. 25, 1903.
C. B. GROUT.
CONTROLLING DEVICE FOR AUTOMOBILES.
APPLICATION FILED FEB. 11, 1903.
NO MODEL. 2 SHEETS—SHEET 1.
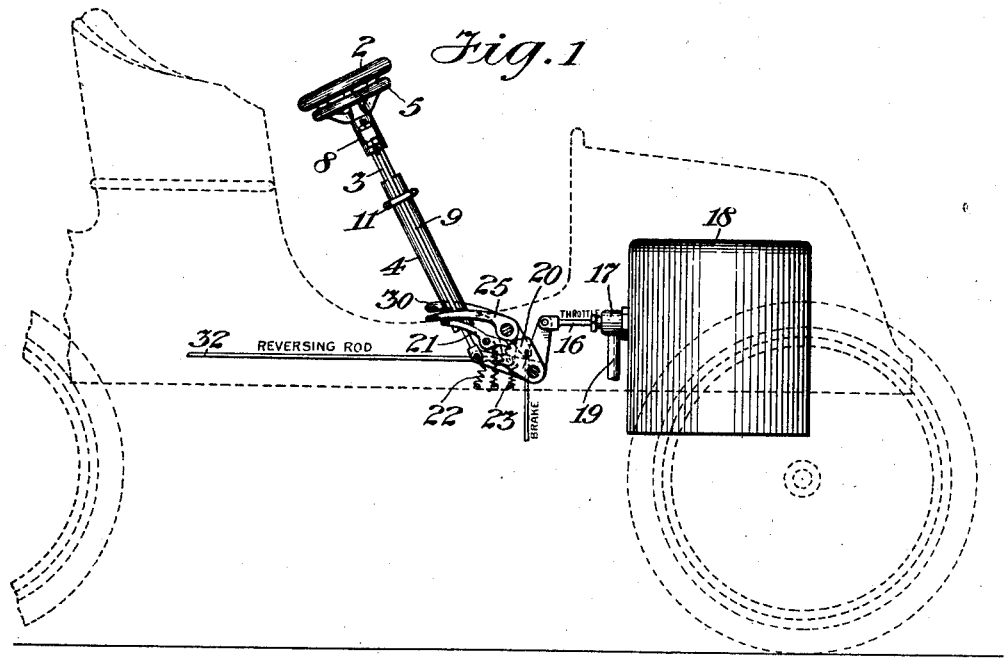
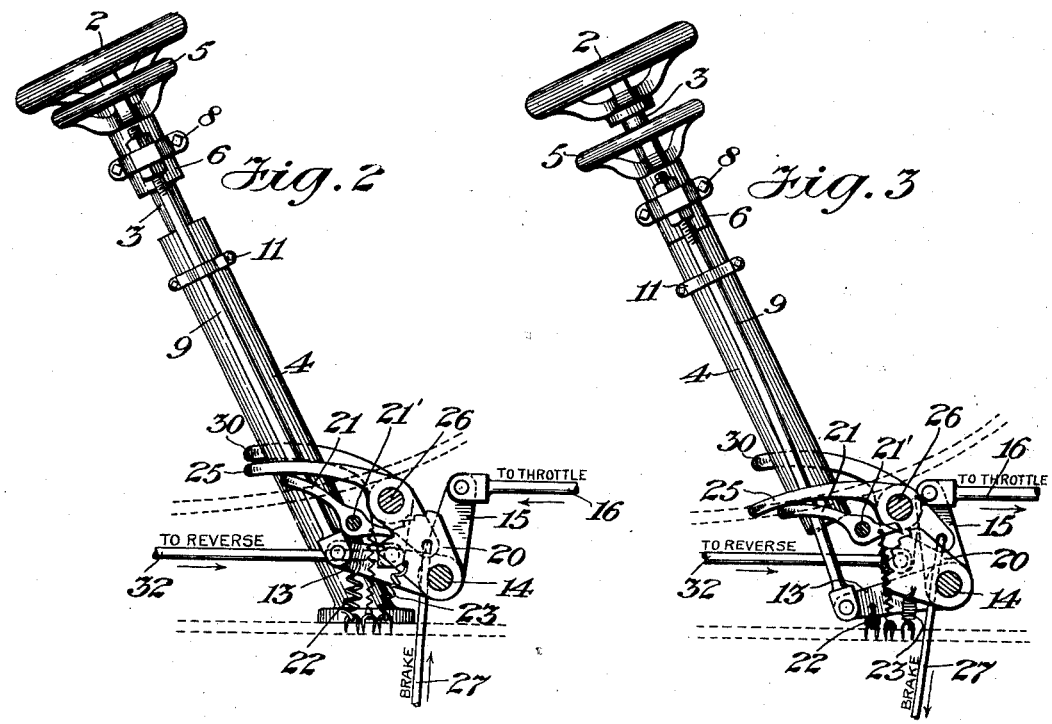
Witnesses
Inventor
Chas. B. Grout
By his Attorney No. 737,399. PATENTED AUG. 25, 1903.
C. B. GROUT.
CONTROLLING DEVICE FOR AUTOMOBILES.
APPLICATION FILED FEB. 11, 1903.
NO MODEL. 2 SHEETS—SHEET 2.
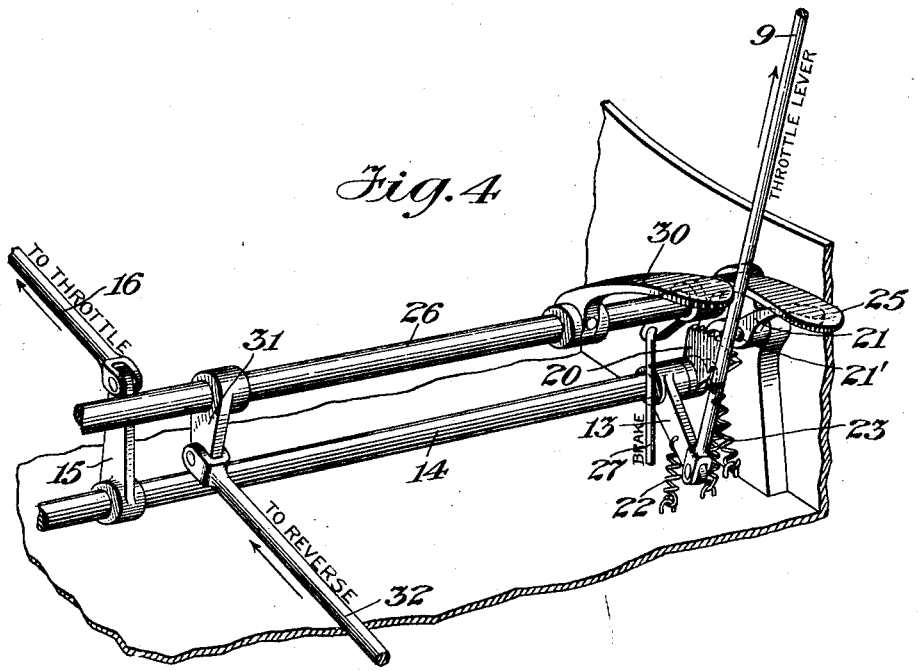
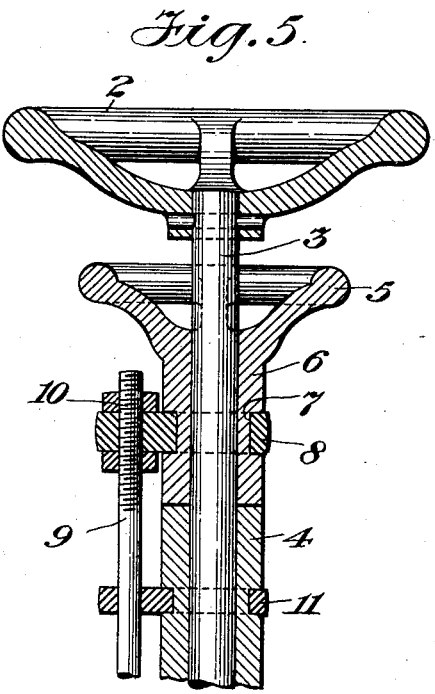
Witnesses
Inventor
Chas. B. Grout
By his Attorney No. 737,399. Patented August 25, 1903.

UNITED STATES PATENT OFFICE.

CHARLES B. GROUT, OF ORANGE, MASSACHUSETTS.

CONTROLLING DEVICE FOR AUTOMOBILES.

SPECIFICATION forming part of Letters Patent No. 737,399, dated August 25, 1903.

Application filed February 11, 1903. Serial No. 142,824. (No model.)

*To all whom it may concern:*

Be it known that I, CHARLES B. GROUT, a citizen of the United States, and a resident of Orange, in the county of Franklin and State of Massachusetts, have invented certain new and useful Improvements in Controlling Devices, of which the following is a specification.

This invention relates to a controlling device for governing the application of power to the motive apparatus of an automobile vehicle, and more particularly for regulating the flow of the fluid by means of which a steam or other fluid actuated engine is operated.

The main object of this invention is to provide a controlling device by means of which the flow of a motive fluid may be properly controlled or throttled without releasing the steering member by means of which the direction of movement of the vehicle is controlled.

In steering and controlling mechanisms as usually constructed heretofore it has been customary to separate the steering and controlling functions and to place the controlling member or handle in such a position as to render it necessary for the operator to release one hand from the steering member or wheel in order to operate the controller. It has been found in practice that this is undesirable, as it is important that the steering member be held in constant control in order to prevent erratic movements of the vehicle, and it being therefore equally important that the attention of the operator be not divided by several handles or wheels located in different positions, but be concentrated substantially at a single point. To the end that this may be accomplished I prefer to employ a controlling member in the form of a controlling-wheel associated with the steering member or steering-wheel in such a manner as to permit the operator to grasp both wheels with his hands at the same time and to impart to the controlling-wheel a relative movement with respect to the steering-wheel without removing his hands from the latter and without disturbing at all the steadiness of the steering. This relative movement may be accomplished in the most advantageous manner by mounting the controlling-wheel close to the steering-wheel, so that it will turn about the steering-axis, and hence turn with the steering-wheel to whatever position the latter may be moved, and by providing for a reciprocatory movement of the controlling-wheel longitudinally of the steering-axis, which movement is utilized to operate a throttle or other suitable device governing the controlling function.

Any suitable means may be employed in connection with the controlling member or wheel for releasing the same and permitting it to return to its normal position after it has been operated to apply the power, as by opening a throttle, a pedal-operated device being preferably employed for this purpose.

An important feature which distinguishes the preferred construction of releasing device used by me from all others with which I am familiar is the employment of a brake-operating pedal as the means for releasing the controlling member or wheel and permitting the power to be shut off, as by the closing of a throttle, before said brake-pedal becomes effective to apply the brake.

Other features of my invention not hereinbefore referred to, but which will be hereinafter described, are illustrated in the accompanying drawings, in which—

Figure 1 is a side elevation, partly in section, of a steering and controlling device in operative relation with a source of fluid-pressure, such as a steam-boiler of an automobile vehicle which is shown in outline. Fig. 2 is an enlarged view of the steering and controlling devices with the controlling-wheel in its "on" position—that is, with the throttle open. Fig. 3 is a similar view showing the controlling-wheel in its normal or "off" position—that is, in position to close the throttle. Fig. 4 is a perspective view of the lower portion of the controlling mechanism and other associated devices. Fig. 5 is an enlarged detail illustrating in longitudinal section the mode of mounting the steering and controlling means.

In carrying my invention into effect I may make use of any suitable steering and controlling members, provided that these are so positioned and so organized that both may be grasped at the same time by the operator and moved in unison.

In order to perform the controlling function, it is of course essential that the controlling member should have a movement relative to that which determines the steering function, and I deem it desirable to perform the steering function in the usual manner by turning a handle or wheel and to perform the controlling function by reciprocating a controlling member or wheel lengthwise of the steering-axis. The steering member is preferably a steering-wheel, such as 2, removably secured to the upper end of a steering-rod 3, mounted to turn in a fixed steering-post, which may be of any suitable type, but in the construction shown is an obliquely-disposed tubular post 4, such as is ordinarily employed in the tonneau and other similar type of automobile. The steering-rod 3 will be connected in the usual manner to the other parts of the steering mechanism, which are not shown herein as they constitute no part of the present invention. At its upper end this steering-rod 3 extends a sufficient distance above the steering-post 4 to permit the controlling member, which is preferably a wheel, such as 5, to be mounted thereon and to have a considerable movement on said steering-rod lengthwise thereof, the limits of such movement being determined by the upper end of the post 4 and by the hub of the steering-wheel 2. This controlling-wheel 5 has a relatively long hub 6, which permits said wheel to be slid up and down on the steering-rod easily and also provides for the connection therewith of a suitable element for transmitting the movement of the controlling-wheel to the throttle or other device which determines the flow of the motive fluid. It will be noticed that the controlling-wheel 5 is associated with the steering-wheel 2 in such a manner that both wheels may be grasped by the operator and manipulated simultaneously without affecting the steadiness of the steering operation, the wheel 5 being preferably somewhat smaller in diameter than the wheel 2 in order that the operator's fingers may grasp the same while the steering-wheel is engaged and steadied by the palms of the hands. The controlling-wheel 5 is free to turn on the steering-rod 3, and hence when the two wheels are held with both hands they turn together freely and the controlling-wheel does not interfere at all with the proper operation of the steering-wheel.

In order to start the vehicle or to increase the speed thereof, the wheel 5 in the present construction is raised, as may be necessary, it being preferable to raise the same step by step in order that the flow of the motive fluid may be gradually increased and unnecessary strains in starting or in increasing speed avoided. It will be noticed that when the steering and controlling wheels are associated in this manner the upper or steering wheel may be held firmly in any desired position while the lower wheel is being gradually elevated by the fingers of both hands.

In order to transmit the throttle-opening-controlling movement of the wheel 5 lengthwise of the steering-axis to the power-controlling or throttle device, I prefer to make use of connections substantially such as are shown in the drawings. The hub 6 of the controlling-wheel 5 in this case has a peripheral groove 7 for the reception of a collar 8, in which said wheel is free to turn, and this collar has a connecting-rod 9 secured to one side thereof, preferably by an adjustable connection 10. At a point below the collar 8 a fixed guide-collar 11 may be secured to the steering-post 4, the connecting-rod 9 passing through one side of this guide-collar, which serves to prevent turning of said rod. At its lower end the connecting-rod 9 is pivoted to the rear end of a rock-arm 13, secured to a rock-shaft 14, mounted in suitable bearings at opposite sides of the vehicle, this rock-shaft 14 having a second rock-arm 15, which at its free end is connected by a rod 16 directly to a throttle device or other power-controlling member. The location of this throttle device is indicated at 17, and the source of fluid-supply or steam-boiler and a pipe through which the steam or fluid flows are designated, respectively, by 18 and 19.

At some suitable point between the steering-wheel and the throttle device I prefer to locate a step-by-step device for opening the throttle gradually and locking it and the controlling-wheel in successive positions. This step-by-step device is shown herein as a toothed segment or rack 20, secured to the rock-shaft 14, and a spring-pressed pawl, such as indicated at 21, is pivoted on a support 21' in a position to coöperate with the teeth of said rack. It will be evident that as the wheel 5 is raised the toothed segment 20 will be turned step by step and that at each movement thereof the locking-pawl 21 will engage it, so as to prevent return movement thereof. This pawl constitutes therefore a means for locking the throttle in any open position and may be instantly released to permit the throttle to close, this closing movement being effected partly by the weight of the gravitative wheel 5 and its connected parts and partly by one or more springs, such as 22 and 23, secured, respectively, to the rock-arm 13 and to the toothed segment 20.

The rear end of the pawl 21 may be operated directly to release the toothed segment 20 and permit the throttle to be closed quickly by the means just described and by the pressure of the fluid or steam against the inner side of the throttle valve, normally tending to close said valve; but I prefer to release said pawl by a brake-pedal, such as 25, loosely mounted on a rock-shaft 26 and connected at its forward end to a brake-rod 27 and lying at its rear end immediately above the rear end of said pawl. These parts are so organized and their movements so proportioned as to cause the brake-pedal 25 when depressed to release the pawl 21 from the toothed segment 20 to permit the throttle to close before the brake is applied, the application of the brake being effected by the depression of the brake-pedal to a lower point than that at which it releases the pawl 21. A suitable reversing-pedal, such as 30, is also secured to the rock-shaft 26 and controls the operation of a rock-arm 31 and a connecting-rod 32, leading to a reversing mechanism. (Not shown.) With the exception of the pedals all of the operating devices near the lower end of the steering-post are beneath the floor of the vehicle and are therefore out of sight and out of the way.

From the foregoing description of my improved controlling device it will be seen that the operator always has both the steering and the controlling wheel either in his hands or in position to be instantly operated either together or separately without having to change his position or divide his attention between two different points, as is ordinarily the case, that the throttle device may be opened gradually and locked in successive open positions without releasing the steering-wheel, and that the throttle device or valve may be instantly closed by the slightest pressure on the brake-pedal without applying the brake, the various functions of steering, controlling, locking the throttle open, releasing the throttle to permit it to close, and applying the brake being all performed from two points without any unnecessary movement or exertion.

What I claim is—

1. In a controlling device of the class specified, the combination with a rotatable steering member, of a rotatable controlling member associated with said steering member and being movable in a direction longitudinally of the steering-axis, the said steering and controlling members being so associated as to be capable of either combined or independent movement.

2. In a controlling device of the class specified, the combination with a rotatable steering member, of a controlling member associated with said steering member and mounted to turn about, and also movable in a direction longitudinally of, the steering-axis, the said steering and controlling members being so associated as to be capable of either combined or independent movement.

3. In a controlling device of the class specified, the combination with a steering-rod, of a controlling member mounted to turn with and about said rod and also being movable longitudinally thereof, the said steering-rod and controlling member being so associated as to be capable of either combined or independent movement.

4. In a controlling device of the class specified, the combination with a steering-rod, of a steering member, a controlling member associated with said steering member and mounted to turn about and also movable longitudinally of the steering-axis, the said steering and controlling members being so associated as to be capable of either combined or independent movement, and a throttle device governed by the said controlling member.

5. In a controlling device of the class specified, the combination with a steering-rod, of a steering member, a controlling member associated with said steering member and mounted to turn about the steering-axis and also having a reciprocatory controlling movement lengthwise of said axis, a connecting-rod reciprocatory with said controlling member, and a throttle device governed by said connecting-rod.

6. In a controlling device of the class specified, the combination with a steering-rod, of a steering member, a controlling member associated with said steering member and movable therewith, a throttle device, a step-by-step device governed by said controlling member and controlling said throttle device, and a locking device for said step-by-step device.

7. In a controlling device of the class specified, the combination with a steering-rod, of a steering member, a controlling member associated with said steering member and movable therewith, a throttle device, a step-by-step device governed by said controlling member and controlling said throttle device, a locking device for said step-by-step device, and means for releasing said locking device.

8. In a controlling device of the class specified, the combination with a steering-rod, of a steering member, a controlling member mounted to turn on said steering-rod and movable therealong, a throttle device, and a connecting-rod reciprocatory with said controlling member and connected to said throttle device.

9. In a controlling device of the class specified, the combination with a steering-rod, of a steering member, a controlling member mounted to turn on said steering-rod and movable therealong, a collar reciprocatory with said controlling member and held against rotation therewith, a throttle device, and a connecting-rod secured to said collar and to said throttle device.

10. In a controlling device of the class specified, the combination with a steering-rod, of a steering member, a controlling member disposed below the steering member and mounted to turn about the steering-axis and also movable longitudinally of said axis toward and from the steering-wheel to open and close the throttle, and a throttle device governed by said controlling member.

11. In a controlling device of the class specified, the combination with a steering-rod, of a steering member, a gravitative controlling member disposed below the steering member and mounted to turn about the steering-axis and also movable longitudinally of said axis toward and from the steering member to open and close the throttle, and a throttle device governed by said controlling member.

12. In a controlling device of the class specified, the combination with a steering member, of a controlling member associated with said steering member and movable therewith, a throttle device governed by said controlling member, means for locking said throttle device in an open position, and a releasing device for said locking means.

13. In a controlling device of the class specified, the combination with a steering member, of a controlling member associated with said steering member and movable therewith, a throttle device governed by said controlling member, means for locking said throttle device in an open position, and a pedal-operated releasing device for said locking means.

14. In a controlling device of the class specified, the combination with a steering member, of a controlling member associated with said steering member and movable therewith, a throttle device governed by said controlling member, means for locking said throttle device in an open position, and a combined throttle-closing and brake-operating device for first releasing said locking means and then applying a brake.

15. In a controlling device of the class specified, the combination with a throttle-opening-controlling device, of a throttle device, means for locking said throttle device in an open position, and a combined throttle-closing and brake-operating device for first releasing said locking means and then applying a brake.

16. In a controlling device of the class specified, the combination with a throttle-opening-controlling member, of a throttle device, a pawl and rack operated by said controlling member and controlling the opening of the throttle, and a combined throttle-closing and brake-operating device for releasing said pawl to permit the throttle to close and for afterward applying a brake.

Signed at Orange, in the county of Franklin and State of Massachusetts, this 4th day of February, A. D. 1903.

CHARLES B. GROUT.

Witnesses:
W. H. MOULTON,
A. M. ANDREWS.